United States Patent
Honda

(10) Patent No.: US 11,200,088 B2
(45) Date of Patent: Dec. 14, 2021

(54) INFORMATION PROCESSING SYSTEM, INFORMATION PROCESSING METHOD, AND INFORMATION PROCESSING APPARATUS

(71) Applicant: Tadashi Honda, Kanagawa (JP)

(72) Inventor: Tadashi Honda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 179 days.

(21) Appl. No.: 16/793,090

(22) Filed: Feb. 18, 2020

(65) Prior Publication Data

US 2020/0285509 A1    Sep. 10, 2020

(30) Foreign Application Priority Data

Mar. 6, 2019  (JP) .............................. JP2019-040839

(51) Int. Cl.
  *G06F 9/46*   (2006.01)
  *G06F 9/48*   (2006.01)
  *G06F 9/50*   (2006.01)

(52) U.S. Cl.
  CPC .......... *G06F 9/4881* (2013.01); *G06F 9/5038* (2013.01); *G06F 2209/486* (2013.01)

(58) Field of Classification Search
  CPC .... G06F 9/4881; G06F 9/5038; G06F 9/5033; G06F 9/505; G06F 9/5005; G06F 9/5027; G06F 9/5083; G06F 9/546; G06F 2209/486; G06F 2209/509; G06F 2209/548; H04L 67/10; H04L 67/1002; H04L 67/1004; H04L 67/1008; H04L 67/1012

See application file for complete search history.

(56) References Cited

U.S. PATENT DOCUMENTS

| 2005/0210472 | A1* | 9/2005 | Accapadi | G06F 9/5033 718/105 |
| 2007/0016908 | A1* | 1/2007 | Kuroda | G06F 9/485 718/107 |
| 2009/0183163 | A1* | 7/2009 | Maruyama | G06F 9/4843 718/103 |
| 2010/0157958 | A1* | 6/2010 | Wong | H04W 72/005 370/337 |
| 2013/0283286 | A1* | 10/2013 | Lee | G06F 9/5027 718/104 |

(Continued)

FOREIGN PATENT DOCUMENTS

| JP | 2004-054909 | 2/2004 |
| JP | 2009-169756 | 7/2009 |
| JP | 2014-149809 | 8/2014 |

*Primary Examiner* — Emerson C Puente
*Assistant Examiner* — Zhi Chen
(74) *Attorney, Agent, or Firm* — IPUSA, PLLC

(57) ABSTRACT

An information processing system, an information processing method, and an information processing apparatus. The information processing system includes at least one memory configured to store a plurality of jobs in order, by type of processing to be executed and a plurality of processors assigned to a specific type of processing to be executed, processes a job assigned to other processor stored in the memory in substitution for the other processor based on a determination that the job of the assigned type of processing is not stored in the memory, and cancels substituting of the processing of the job assigned to the other processor according to a processing status of at least one of other processors.

6 Claims, 10 Drawing Sheets

(56) References Cited

U.S. PATENT DOCUMENTS

| | | |
|---|---|---|
| 2014/0201759 A1 | 7/2014 | Amikura |
| 2014/0223004 A1 | 8/2014 | Honda et al. |
| 2014/0368516 A1* | 12/2014 | Taggart .................... G06T 1/20 |
| | | 345/505 |
| 2015/0282011 A1* | 10/2015 | Watfa ................ H04W 36/0022 |
| | | 370/332 |
| 2016/0117498 A1* | 4/2016 | Saxena ................ G06F 9/5027 |
| | | 726/23 |

* cited by examiner

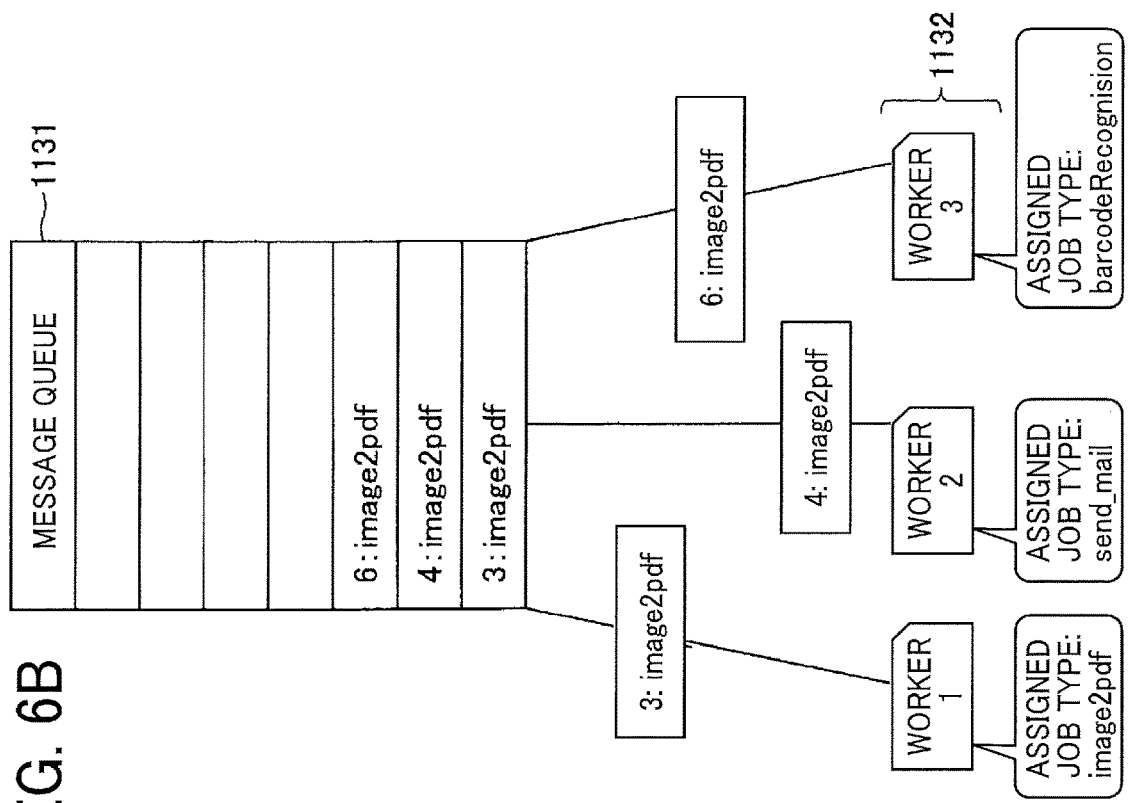
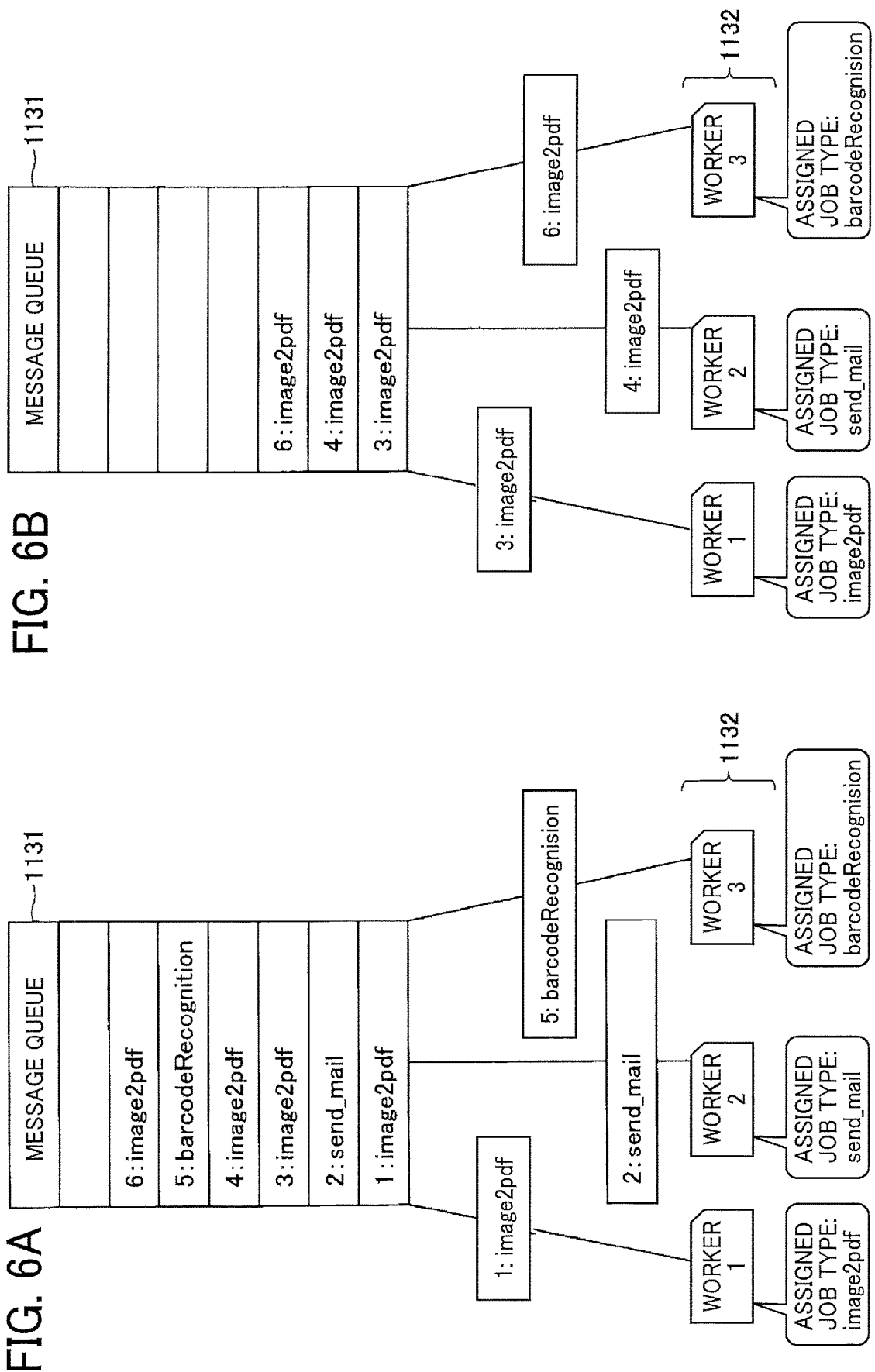
FIG. 6A
FIG. 6B

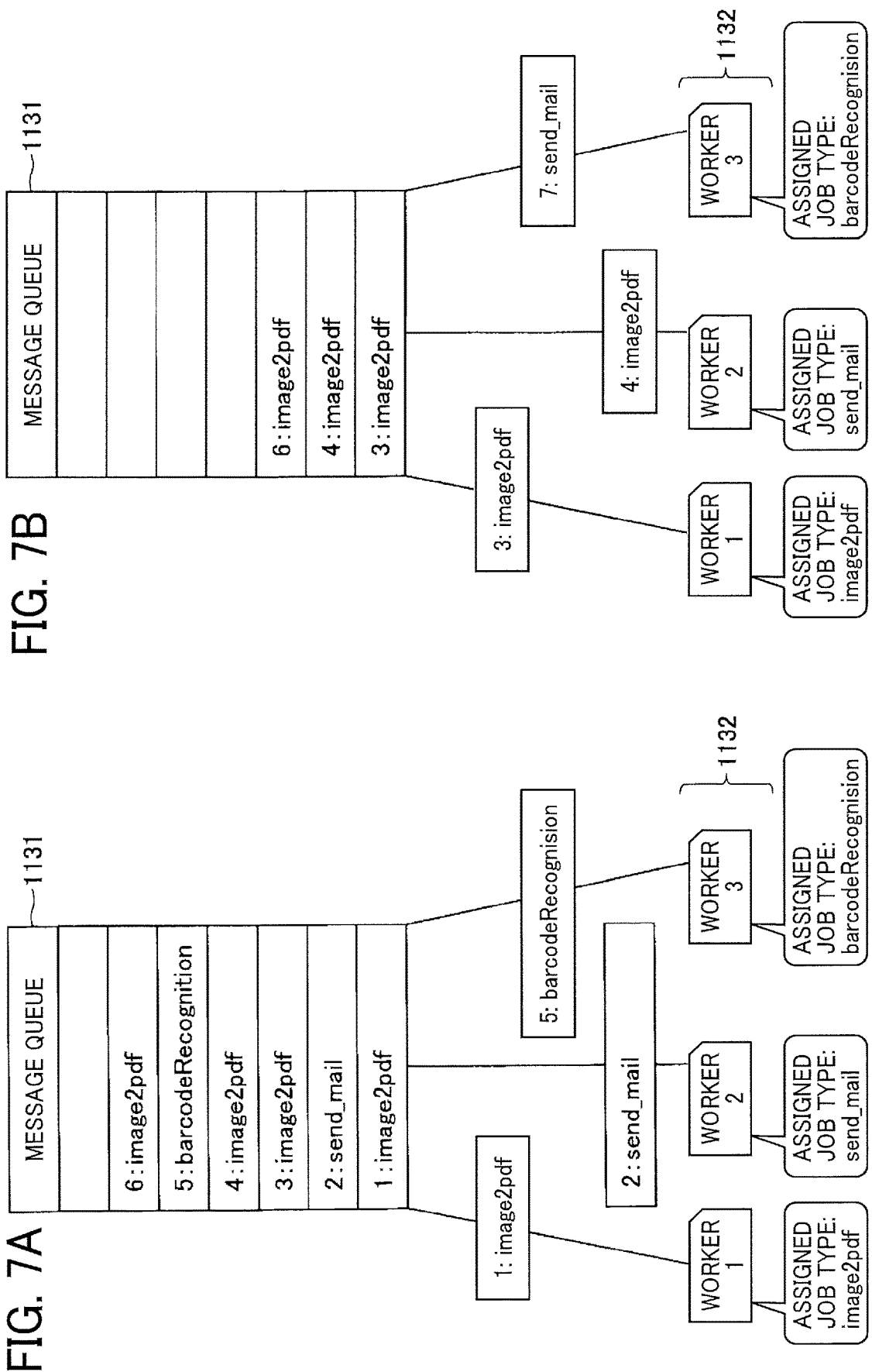

FIG. 9

| JOB ID | USER ID | STATUS | SUBMITTED DATE AND TIME | JOB TYPE | PARAMETER |
|---|---|---|---|---|---|
| 3 | AAA | processing | 2018/11/18 13:55 | image2pdf | param1 |
| 4 | AAA | processing | 2018/11/18 13:57 | image2pdf | param2 |
| 6 | AAA | accepted | 2018/11/18 13:58 | image2pdf | param3 |
| 7 | BBB | accepted | 2018/11/18 14:01 | send_mail | param4 |
| 8 | CCC | accepted | 2018/11/18 14:02 | ocr | param5 |
| 9 | BBB | accepted | 2018/11/18 14:04 | send_mail | param6 |

FIG. 10

| ASSIGNED WORKER | JOB ID | JOB TYPE | STATUS | START DATE AND TIME | USER ID |
|---|---|---|---|---|---|
| Worker1 | 3 | image2pdf | processing | 2018/11/18 13:56 | AAA |
| Worker2 | 4 | image2pdf | processing | 2018/11/18 13:58 | AAA |
| | | | | | |
| | | | | | |
| | | | | | |
| | | | | | |

FIG. 11

| JOB TYPE | RESOURCE CONSUMPTION |
|---|---|
| image2pdf | 40 |
| send_mail | 5 |
| barcodeRecognition | 60 |
| ocr | 100 |

INFORMATION PROCESSING SYSTEM, INFORMATION PROCESSING METHOD, AND INFORMATION PROCESSING APPARATUS

CROSS-REFERENCE TO RELATED APPLICATIONS

This patent application is based on and claims priority pursuant to 35 U.S.C. § 119(a) to Japanese Patent Application No. 2019-040839, filed on Mar. 6, 2019 in the Japan Patent Office, the entire disclosure of which is hereby incorporated by reference herein.

BACKGROUND

Technical Field

The present disclosure relates to an information processing system, an information processing method, and an information processing apparatus.

Background Art

In a conventional distributed processing method in grid computing, a master computer (hereinafter, simply referred to as "master") distributes a set of processing to a plurality of worker computers (hereinafter, simply referred to as "workers").

The master and workers communicably connected through a network exchange data relating to jobs. The master submits the job and data necessary for processing the job to the worker. The worker executes the job submitted by the master using the data necessary for processing the job submitted by the master.

The worker that has executed the job process returns the job process result to the master. The master distributes the entire job to the workers by inputting the job and data necessary for processing the job to a plurality of workers.

SUMMARY

Embodiments of the present disclosure describe an information processing system, an information processing method, and an information processing apparatus. The information processing system includes at least one memory configured to store a plurality of jobs in order, by type of processing to be executed and a plurality of processors assigned to a specific type of processing to be executed, processes a job assigned to other processor stored in the memory in substitution for the other processor based on a determination that the job of the assigned type of processing is not stored in the memory, and cancels substituting of the processing of the job assigned to the other processor according to a processing status of at least one of other processors.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 6A and FIG. 6B are diagrams illustrating a mechanism for substitution of a job processing;

FIG. 7A and FIG. 7B are diagrams illustrating a mechanism for canceling substitution of the job processing;

FIG. 9 is a diagram illustrating an example of a job information table;

FIG. 10 is a diagram illustrating an example of a task status table; and

FIG. 11 is a diagram illustrating an example of a processing load table.

Figure 1:
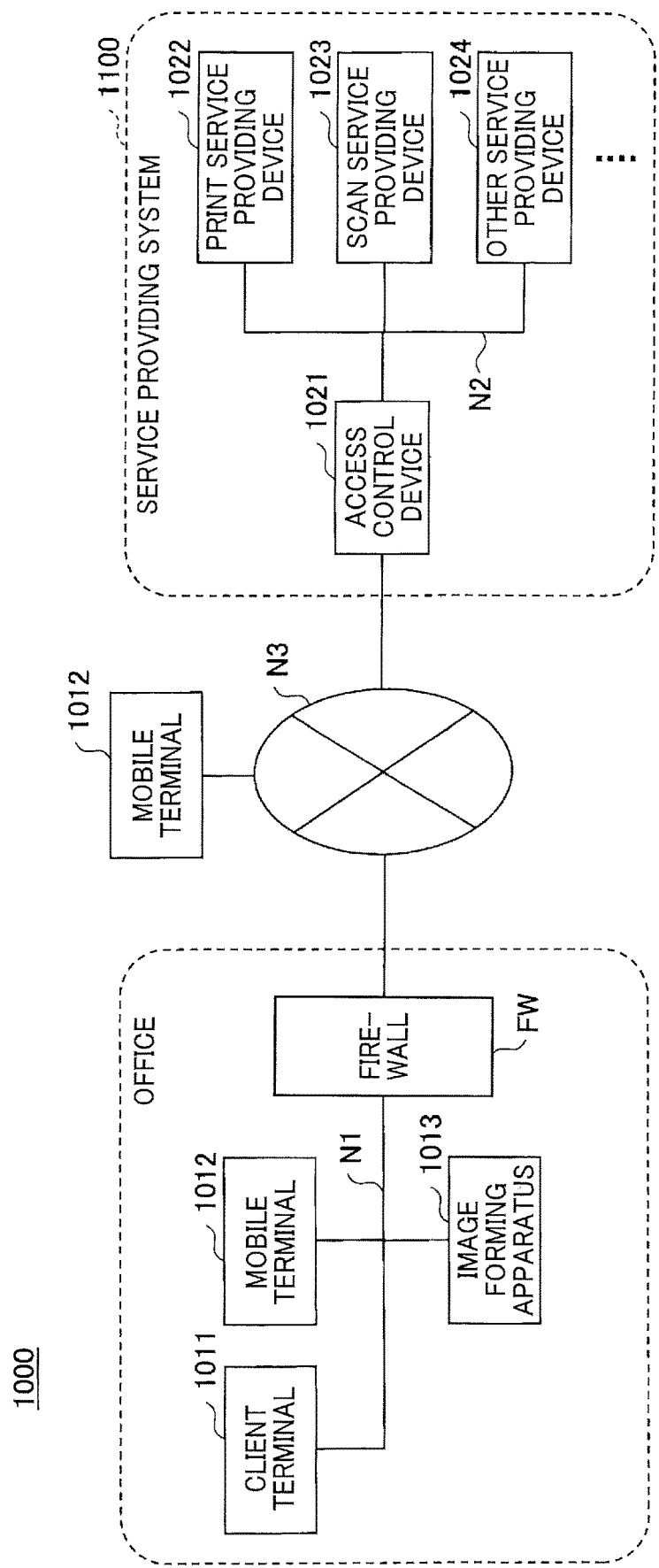
FIG. 1 is a schematic view illustrating a configuration of an information processing system according to embodiments of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. As used herein, the singular forms "a", "an", and "the" are intended to include the plural forms as well, unless the context clearly indicates otherwise.

Hereinafter, a description is given of several embodiments of the present disclosure with reference to the drawings.

FIG. 1 is a schematic view illustrating a configuration of an information processing system according to the embodiments of the present disclosure.

The system 1000 in FIG. 1 includes, for example, a network N1 such as an office network, a network N2 of a service providing system 1100 such as a cloud service, and a network N3 such as the internet.

The network N1 is a private network inside a firewall FW.

A client terminal 1011, a mobile terminal 1012, and an image forming apparatus 1013 such as a multifunction peripheral (MFP) are connected to the network N1.

The client terminal 1011, the mobile terminal 1012, and the image forming apparatus 1013 such as the MFP have a wireless or wired communication capability.

The client terminal 1011 is an example of a terminal device.

The client terminal 1011 is the terminal device such as a desktop personal computer (PC) or a notebook PC that can be operated by a user, which may be carried or not carried by the user.

The mobile terminal 1012 is another example of the terminal device.

The mobile terminal 1012 is the terminal device that can be carried by a user, such as a smartphone, a mobile phone, or a tablet terminal.

The image forming apparatus 1013 is an apparatus having an image forming function, such as the MFP.

The image forming apparatus 1013 is the apparatus that performs processing related to image formation, such as the MFP, a copier, a scanner, a printer, a laser printer, a projector, or an electronic whiteboard such as an interactive whiteboard (IWB). The image forming thus includes not only forming an image on a recording sheet but drawing an image on a screen or projecting an image on a screen.

In addition or in alternative to the image forming apparatus 1013, any information processing apparatus may be connected to the network N1, which includes, for example, a device such as a projector (PJ), an interactive whiteboard (IWB), a digital signage, a head up display (HUD) device, an industrial machine, an imaging device, a sound collecting device, a medical device, a network home appliance, a car (connected car), the notebook PC, the mobile phone, the smartphone, the tablet terminal, a game machine, a personal digital assistant (PDA), a digital camera, a wearable PC or the desktop PC. IWB is an electronic whiteboard capable of mutual communication.

FIG. 1 illustrates an example in which one client terminal 1011, one mobile terminal 1012, and one image forming apparatus 1013 is provided, but a plurality of client terminals 1011, mobile terminals 1012, and image forming apparatuses 1013 may be provided.

Still referring to FIG. 1, an access control device 1021 connects the network N2 and the network N3.

A print service providing device 1022, a scan service providing device 1023, and another service providing device 1024 are connected to the network N2 via the access control device 1021.

In the system 1000 illustrated in FIG. 1, the access control device 1021, the print service providing device 1022, the scan service providing device 1023, and the other service providing device 1024 are included in the service providing system 1100.

The access control device 1021 controls login from the client terminal 1011 or the like to the print service providing device 1022, the scan service providing device 1023, or the other service providing device 1024. The print service providing device 1022 provides a print service to the client terminal 1011 and the like. The scan service providing device 1023 provides a scan service to the client terminal 1011 and the like.

One or more information processing apparatuses implement the access control device 1021, the print service providing device 1022, the scan service providing device 1023, and the other service providing device 1024.

The access control device 1021, the print service providing device 1022, the scan service providing device 1023, and the other service providing device 1024 may be implemented by one information processing apparatus. Alternatively, functions of the access control device 1021, the print service providing device 1022, the scan service providing device 1023, and the other service providing device 1024 may be distributed to a plurality of information processing apparatuses.

Some of the services on the network N2 may be implemented outside the network N2.

The mobile terminal 1012 may exist outside the network N1 such as an office network.

In the system 1000 of FIG. 1, an example is illustrated in which the mobile terminal 1012 is connected to the network N1 and to the network N3.

Figure 2:
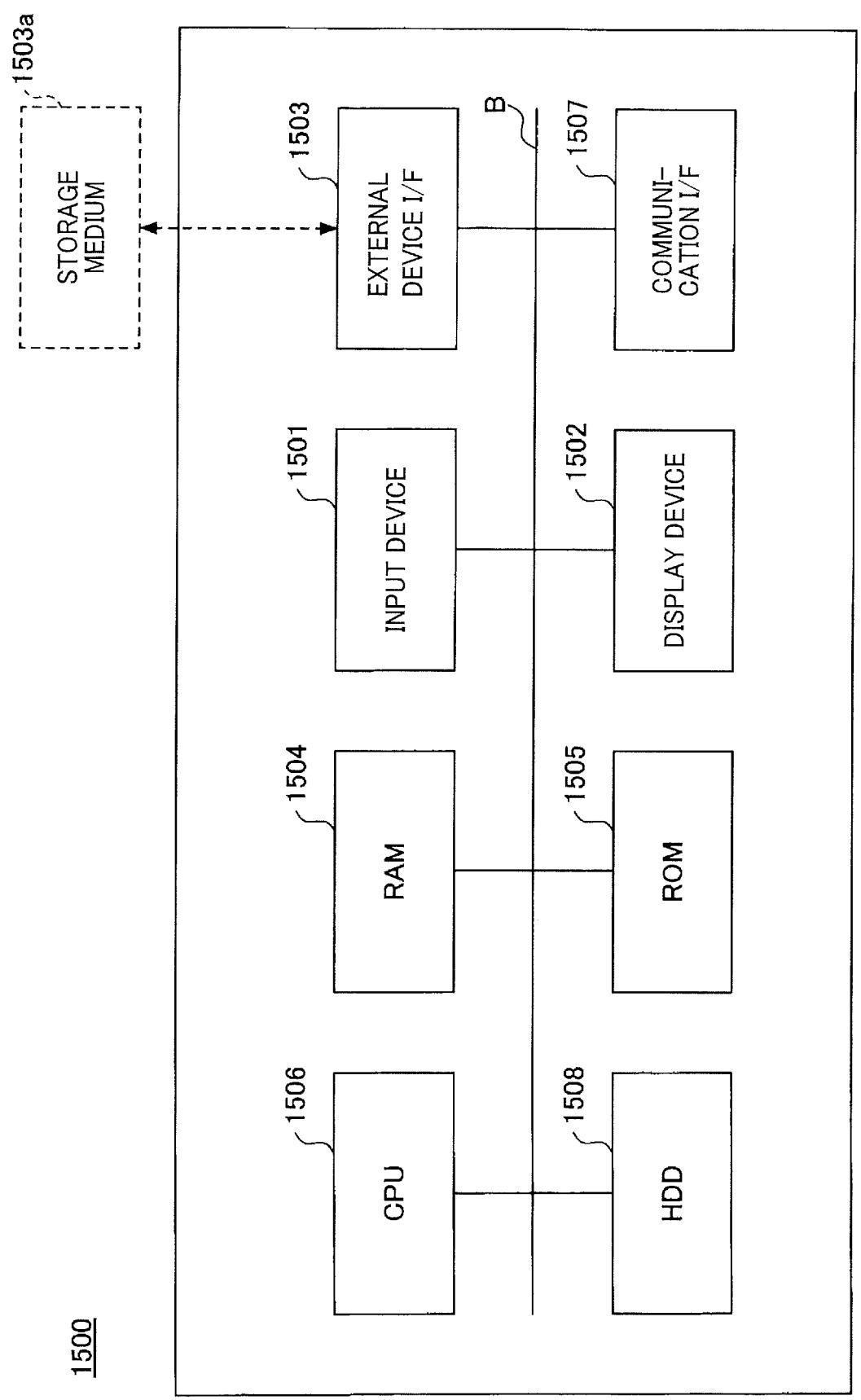
FIG. 2 is a block diagram illustrating a hardware configuration of a computer according to embodiments of the present disclosure.

For example, the client terminal 1011, the mobile terminal 1012, the access control device 1021, the print service providing device 1022, the scan service providing device 1023, and the other service providing device 1024 are implemented by a general-purpose computer having a hardware configuration illustrated in FIG. 2.

FIG. 2 is a block diagram illustrating the hardware configuration of the computer.

The computer 1500 includes an input device 1501, a display device 1502, an external device interface (I/F) 1503, a random access memory (RAM) 1504, a read only memory (ROM) 1505, a central processing unit (CPU) 1506, a communication I/F 1507, and a hard disk drive (HDD) 1508 and the like. A bus B connects the input device 1501, the display device 1502, the external device I/F 1503, the RAM 1504, the ROM 1505, the CPU 1506, the communication I/F 1507, and the HDD 1508 to each other.

The input device 1501 includes a keyboard, a mouse, a touch panel, and the like. The input device 1501 receives a user instruction to input operation signals according to the user instruction.

The display device 1502 includes a display and the like. The display device 1502 displays a processing result by the computer 1500.

The computer 1500 may connect and use the input device 1501 and the display device 1502 when necessary.

The communication I/F 1507 is an interface for connecting the computer 1500 to any of the networks N1 to N3.

The computer 1500 performs data communication through the communication I/F 1507.

The HDD 1508 is a nonvolatile storage device that stores programs and data.

Examples of programs or data stored in the HDD 1508 include an operating system (OS) or application software providing various functions on the OS. The OS is basic software for controlling the entire computer 1500. The application software provides various functions on the OS.

The computer 1500 may use a drive device using a flash memory, for example, a solid state drive (SSD) as a storage medium instead of the HDD 1508.

The external device I/F 1503 is an interface with an external device.

The external device includes a storage medium 1503a and the like.

The external device I/F 1503 enables the computer 1500 to read or write data from or to the storage medium 1503a.

Examples of the storage medium 1503a include a flexible disc, a compact disc (CD), a digital versatile disc (DVD), a secure digital (SD) memory card, and a universal serial bus (USB) memory.

The ROM 1505 is an example of a nonvolatile semiconductor memory (storage device), which holds programs and/or data even after the computer 1500 is turned off as the power is not supplied.

The ROM 1505 stores programs and data such as a basic input/output system (BIOS), OS settings, and network settings. The computer 1500 executes the BIOS at the time of starting.

The RAM 1504 is the volatile semiconductor memory (storage device) that temporarily stores programs and data.

The CPU 1506 reads a program or data from a storage device such as the ROM 1505 and the HDD 1508 onto the RAM 1504 and executes processing. The CPU 1506 is an arithmetic device that implements control and functions of the entire computer 1500 by executing processing.

The client terminal 1011, the mobile terminal 1012, the access control device 1021, the print service providing device 1022, the scan service providing device 1023, and the other service providing device 1024 can implement various processes described below by the hardware configuration of the computer 1500.

Figure 3:
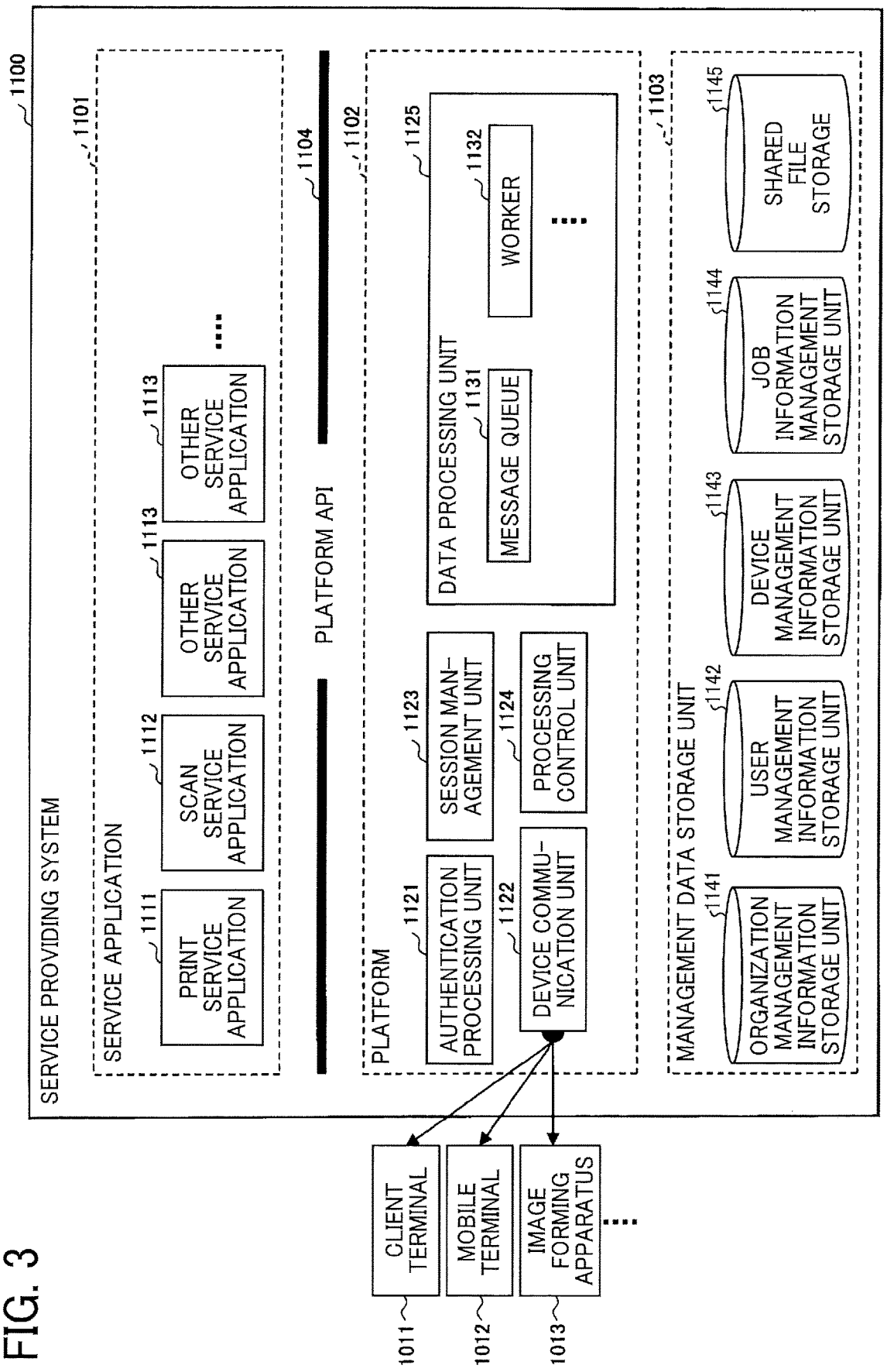
FIG. 3 is a block diagram illustrating a functional configuration of a service providing system according to embodiments of the present disclosure.

The service providing system 1100 in FIG. 1 implements, for example, functional blocks as illustrated in FIG. 3.

FIG. 3 is a block diagram illustrating the service providing system according to the embodiments of the present disclosure.

The service providing system 1100 of FIG. 3 implements a service application 1101, a platform 1102, a management data storage unit 1103, and a platform application programming interface (API) 1104 by executing a program.

The service application 1101 includes, as an example, a print service application 1111, a scan service application 1112, and one or more other service applications 1113.

The print service application 1111 is the application that provides the print service.

The scan service application 1112 is the application that provides the scan service.

The other service application 1113 is the application that provides other services.

The platform API 1104 is an interface through which the service application 1101 such as the print service application 1111, the scan service application 1112, and the other service application 1113 uses the platform 1102.

The platform API 1104 is a predefined interface provided for the platform 1102 to receive a request from the service application 1101. The platform API 1104 includes, for example, a function or a class.

When the service providing system 1100 is configured to be distributed to a plurality of information processing apparatuses, the platform API 1104 may use, for example, a web API that can be used through the network.

The platform 1102 includes an authentication processing unit 1121, a device communication unit 1122, a session management unit 1123, a processing control unit 1124, and a data processing unit 1125.

The data processing unit 1125 includes a message queue 1131 and one or more workers 1132.

The authentication processing unit 1121 executes authentication based on a login request from office device such as the client terminal 1011, the mobile terminal 1012, and the image forming apparatus 1013.

The office device is a general term for the client terminal 1011, the mobile terminal 1012, the image forming apparatus 1013, and the like, which is disposed in the office.

The authentication processing unit 1121 accesses, for example, the user management information storage unit 1142 to authenticate the user.

The authentication processing unit 1121 accesses the organization management information storage unit 1141 and the device management information storage unit 1143 to authenticate the image forming apparatus 1013 and the like.

The device communication unit 1122 executes communication with the office device.

The session management unit 1123 manages a session with the office device.

The processing control unit 1124 controls data processing executed by the data processing unit 1125 based on a request from the service application 1101.

The data processing unit 1125 executes data processing under the control of the processing control unit 1124.

The message queue 1131 has a queue corresponding to a type of job processing (job type). The processing control unit 1124 queues the job in the message queue 1131.

The queue holds jobs in the order in which jobs are processed.

The worker 1132 monitors the queue in charge.

When a job is queued in the monitored queue, the worker 1132 performs processing according to the job type of the queued job.

As described below, the worker 1132 may substitute a job processing even when the job is not queued in the queue in charge, if the conditions are met.

The management data storage unit 1103 includes an organization management information storage unit 1141, a user management information storage unit 1142, a device management information storage unit 1143, a job information management storage unit 1144, and a shared file storage 1145.

The organization management information storage unit 1141 stores organization management information.

The user management information storage unit 1142 stores user management information.

The device management information storage unit 1143 stores device management information.

The job information management storage unit 1144 stores a job information table 1203, a task status table 1204, and a processing load table 1205 which are described below.

The shared file storage 1145 stores files such as electronic document files of the jobs in the queue.

The service providing system 1100 functions as a cloud base and a service group. For example, the cloud base provides functions such as authentication and data processing. The service group provides services such as the print service using the functions of the cloud base.

For example, the platform 1102, the management data storage unit 1103, and the platform API 1104 forms the cloud base.

For example, the service application 1101 forms the service group.

Figure 4:
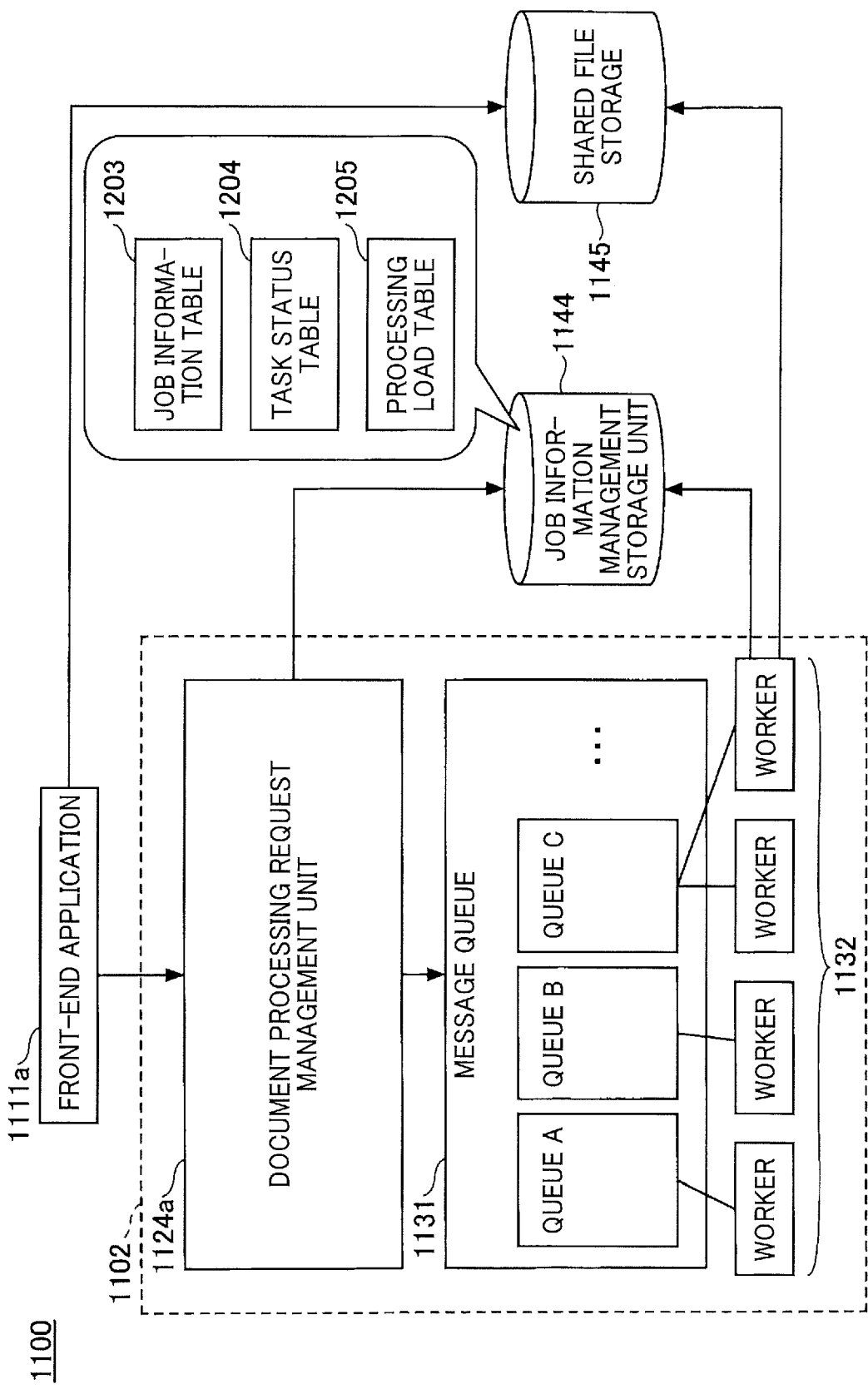
FIG. 4 is a block diagram illustrating the service providing system implementing a job execution process according to embodiments of the present disclosure.

The service providing system 1100 according to the present embodiment executes job processing by a part of the functional configuration illustrated in FIG. 3, as described referring to FIG. 4.

FIG. 4 is a block diagram illustrating a functional configuration of the service providing system implementing a job execution process according to the present embodiment.

The service providing system 1100 in FIG. 4 executes a job instructed by a user by using a front-end application 1111a, the platform 1102, the job information management storage unit 1144, and the shared file storage 1145.

FIG. 4 illustrates the front-end application 1111a, which is a function of the print service application 1111. The front-end application 1111a may be a function of the scan service application 1112 or the other service application 1113.

The service providing system 1100 of FIG. 4 executes the job from the user using a document processing request management unit 1124a, the message queue 1131 and the worker 1132 of the platform 1102. The document processing request management unit 1124a is a function of the processing control unit 1124.

The front-end application 1111a receives the job transmitted from the terminal device such as the client terminal 1011.

The front-end application 1111a has a function of storing a file to be processed such as an electronic document file included in the job in the shared file storage 1145.

Further, the front-end application 1111*a* has a function of submitting a job to the document processing request management unit 1124*a* together with a uniform resource indicator (URI) of the file to be processed stored in the shared file storage 1145.

As described above, the front-end application 1111*a* determines necessary processing and controls the platform 1102 to execute job processing.

The front-end application 1111*a* converts the determined necessary processing into a job type parameter such as "doc2rpcs" and embeds the parameter in job information submitted to the document processing request management unit 1124*a*.

The details of the job type parameter is described below.

The document processing request management unit 1124*a* receives the job information including the job type parameter.

The document processing request management unit 1124*a* analyzes the job information received from the front-end application 1111*a*. The document processing request management unit 1124*a* puts (queues) the job in a queue of the message queue 1131 whose job type matches.

In addition, the document processing request management unit 1124*a* stores the job information in the job information management storage unit 1144 in parallel with putting the job in the message queue 1131.

The message queue 1131 has queues corresponding to a plurality of job types.

The worker 1132 monitors (polls) the queue in charge. If a job exists in the queue, the worker 1132 retrieves the job information corresponding to the job from the job information management storage unit 1144.

Further, the worker 1132 acquires the file to be processed from the shared file storage 1145.

The worker 1132 performs processing on the acquired file based on the job information acquired from the job information management storage unit 1144.

For example, when performing data conversion processing, the worker 1132 acquires the file to be processed from the shared file storage 1145 based on the URI of the file to be processed.

The worker 1132 performs data conversion of the acquired file to be processed.

The worker 1132 stores the converted file in the shared file storage 1145 and updates the job information stored in the job information management storage unit 1144.

The service providing system 1100 according to the present embodiment stores a job information table 1203, a task status table 1204, and a processing load table 1205, which are described below, in order to reduce inefficiency in the substitution of the job processing in the job information management storage unit 1144.

For example, the worker 1132 that performs processing stores the type of processing and start date and time of the job being executed in the task status table 1204 as the job information.

When the job processing is completed, the worker 1132 deletes the information of the processed job from the task status table 1204.

The worker 1132 stores processing result in the shared file storage 1145 and the URI of the stored processing result in the job information management storage unit 1144 and updates the status of the job information table 1203 to "completed".

The service providing system 1100 according to the present embodiment uses the job information table 1203, the task status table 1204, and the processing load table 1205, which are described below, to reduce inefficiency in the substitution of the job processing.

Hereinafter, details of the job execution process of the service providing system 1100 according to the present embodiment is described.

Figure 5B:
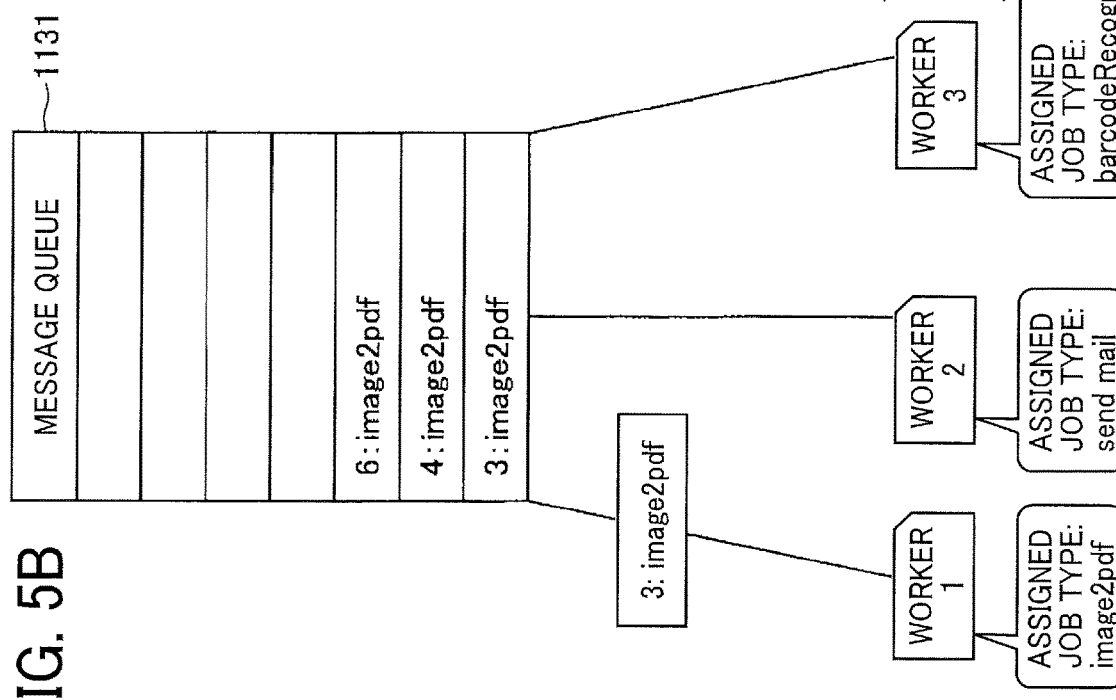
FIG. 5A and FIG. 5B are diagrams illustrating an example of worker queue processing.
Figure 5A:
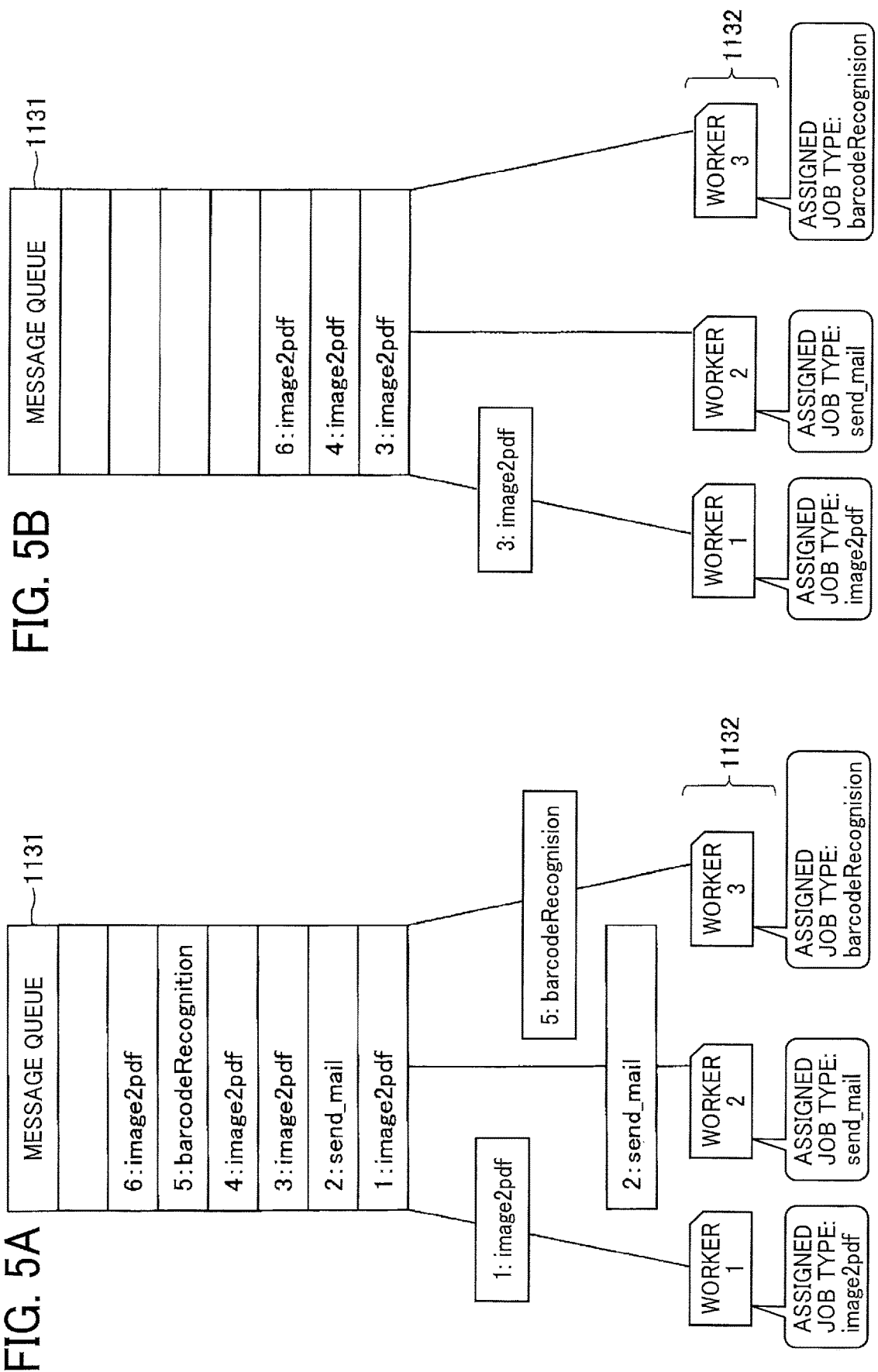

FIG. 5A and FIG. 5B are diagrams illustrating an example of worker queue processing.

In FIG. 5A and FIG. 5B, a job type "image2pdf", a job type "send_mail", and a job type "barcodeRecognition" are illustrated as an example. The worker 1132 assigned to the job type "image2pdf" is hereinafter simply referred to as "worker 1". The worker 1132 assigned to the job type "send_mail" is hereinafter simply referred to as "worker 2". The worker 1132 assigned to the job type "barcodeRecognition" is hereinafter simply referred to as "worker 3".

For example, the job type "image2pdf" indicates converting an image to an image having a personal document format (PDF).

The job type "send_mail" indicates mail transmission processing.

The job type "barcodeRecognition" indicates barcode recognition processing.

The worker 1, the worker 2, and the worker 3 monitor the message queue 1131, acquire the job from the assigned queue, and perform processing according to the job type.

Although omitted in FIG. 5A and FIG. 5B, the job is assumed to be distributed to the queue of the message queue 1131 with matching job type.

For example, in FIG. 5A, the worker 1 acquires a job "1" and performs processing on the acquired job "1". The worker 2 acquires a job "2" and performs processing on the acquired job "2". The worker 3 acquires a job "5" and performs processing on the acquired job "5".

When the processing in FIG. 5A is completed, the jobs existing in the message queue 1131 are as illustrated in FIG. 5B.

In FIG. 5B, the worker 1 assigned to the job type "image2pdf" acquires the job "3" and performs processing on the acquired job "3".

On the other hand, the worker 2 assigned to the job type "send_mail" continues to wait for the job of the job type "send_mail" to be queued.

Similarly, the worker 3 assigned to the job type "barcodeRecognition" continues to wait for the job of the job type "barcodeRecognition" to be queued.

When only the worker 1 is assigned to the job type "image2pdf" as illustrated in FIG. 5A and FIG. 5B, the worker 1 processes the jobs "3", "4", and "6" in order as illustrated in FIG. 5B.

In the example of FIG. 5B, waiting time of the user who has submitted the job "6" becomes longer even though resources (CPU/memory/HDD/network, etc.) for the worker 2 and the worker 3 are remaining.

In order to improve efficiency, for example, the worker 1 and the worker 2 may be assigned to two job types "image2pdf" and "send_mail".

If the worker 1 and the worker 2 are assigned to two job types "image2pdf" and "send_mail", the worker 1 and the worker 2 can acquire and process the job regardless of which job is stored in the queue.

However, the worker 3 assigned to the job type "barcodeRecognition" continues to wait for the job of the job type "barcodeRecognition" to be queued.

As described above, in the case where the job type assigned to the worker 1132 is statically determined, efficiency of the job processing is difficult to improve because the job type of the job submitted by the user is not known.

In order to improve the efficiency of the job processing, a mechanism as illustrated in FIG. 6A and FIG. 6B in which the assigned job type to substitute the job processing is dynamically changed for the worker 1, worker 2, and worker 3.

FIG. 6A and FIG. 6B are diagrams illustrating the mechanism for the substitution of the job processing.

FIG. 6A is the same as FIG. 5A, as processing for the jobs "1", "2", and "5" are performed in a same manner.

In FIG. 6B, the worker 1 acquires the job "3" of the assigned job type "image2pdf" and performs processing on the acquired job "3".

At the same time, a job which the worker 2 and worker 3 are assigned to does not exist in the message queue 1131. The workers 2 and 3 substitute the processing of the accumulated job when a certain number or more jobs of the job type assigned to the worker 1 are accumulated.

For example, in FIG. 6B, the worker 1 acquires the job "3" and performs processing on the acquired job "3". The worker 2 acquires the job "4" and performs processing on the acquired job "4". The worker 3 acquires the job "6" and performs processing on the acquired job "6".

Since the service providing system 1100 in which the mechanism of FIG. 6B is introduced can use resources more efficiently than the mechanism of FIG. 5B, the waiting time of the user who submitted the job "6" is shorter than the waiting time of the mechanism of FIG. 5B.

In the example illustrated in FIG. 6B, all the workers 1, 2, and 3 process the job of the job type "image2pdf".

For example, when job "7" of the job type "send_mail" is queued in the message queue 1131 after the worker 2 acquired the job "4", processing of the job "7" is delayed.

The processing of the job "7" of the job type "send_mail" may delay when a user submits a large number of jobs of the job type "image2pdf".

The above described situation in which the processing of the job "7" is delayed may increase as the number of users using the service providing system 1100 increases. The mechanism as illustrated in FIG. 6B in which the job processing is substituted by other workers by dynamically changing the assigned job type has a problem that the waiting time of the user who has submitted one job may become longer.

The service providing system 1100 submits a monitoring job at preset time intervals in order to check whether the service providing system 1100 is operating normally. The service providing system 1100 checks whether the processing of the monitoring job is completed normally.

As described above, the service providing system 1100 waits for a preset period of time until the processing of the monitoring job completes and checks whether the processing result of the monitoring job is normal.

In the example illustrated in FIG. 6B, all the workers 1, 2, and 3 are executing the jobs of the job type "image2pdf". When the monitoring job is submitted while all the workers 1, 2, and 3 are executing the jobs of the job type "image2pdf", the service providing system 1100 may not be able to complete the processing of the monitoring job within the preset period of time.

The service providing system 1100 outputs an error if the processing of the monitoring job is not completed normally within the preset period of time.

The service providing system 1100 may not comply with a service level objective (SLO) when the error is output and an administrator or the user is notified of the error. Also, the error output is an important issue to be avoided in system operation.

In the job execution process of the service providing system 1100 according to the present embodiment, a mechanism for canceling the substitution of the job processing illustrated in FIG. 7A and FIG. 7B may be added to the mechanism of the substitution of the job processing illustrated in FIG. 6A and FIG. 6B.

FIG. 7A and FIG. 7B are diagrams illustrating the mechanism for canceling the substitution of the job processing.

FIG. 7A is the same as FIG. 5A, as processing for the jobs "1", "2", and "5" are performed in a same manner.

In FIG. 7B, the worker 1 assigned to the job type "image2pdf" acquires the job "3" and performs processing on the acquired job "3".

At the same time, the job of the job type which the worker 2 and worker 3 are assigned to does not exist in the message queue 1131. The worker 2 performs processing of the job type "image2pdf" assigned to the worker 1.

On the other hand, the worker 3 does not substitute the processing of the job type "image2pdf" assigned to the worker 1.

As described above, in the job execution process of the service providing system 1100 according to the present embodiment, the worker 2 and the worker 3 make different determinations on the substitution of the job processing.

Figure 8:
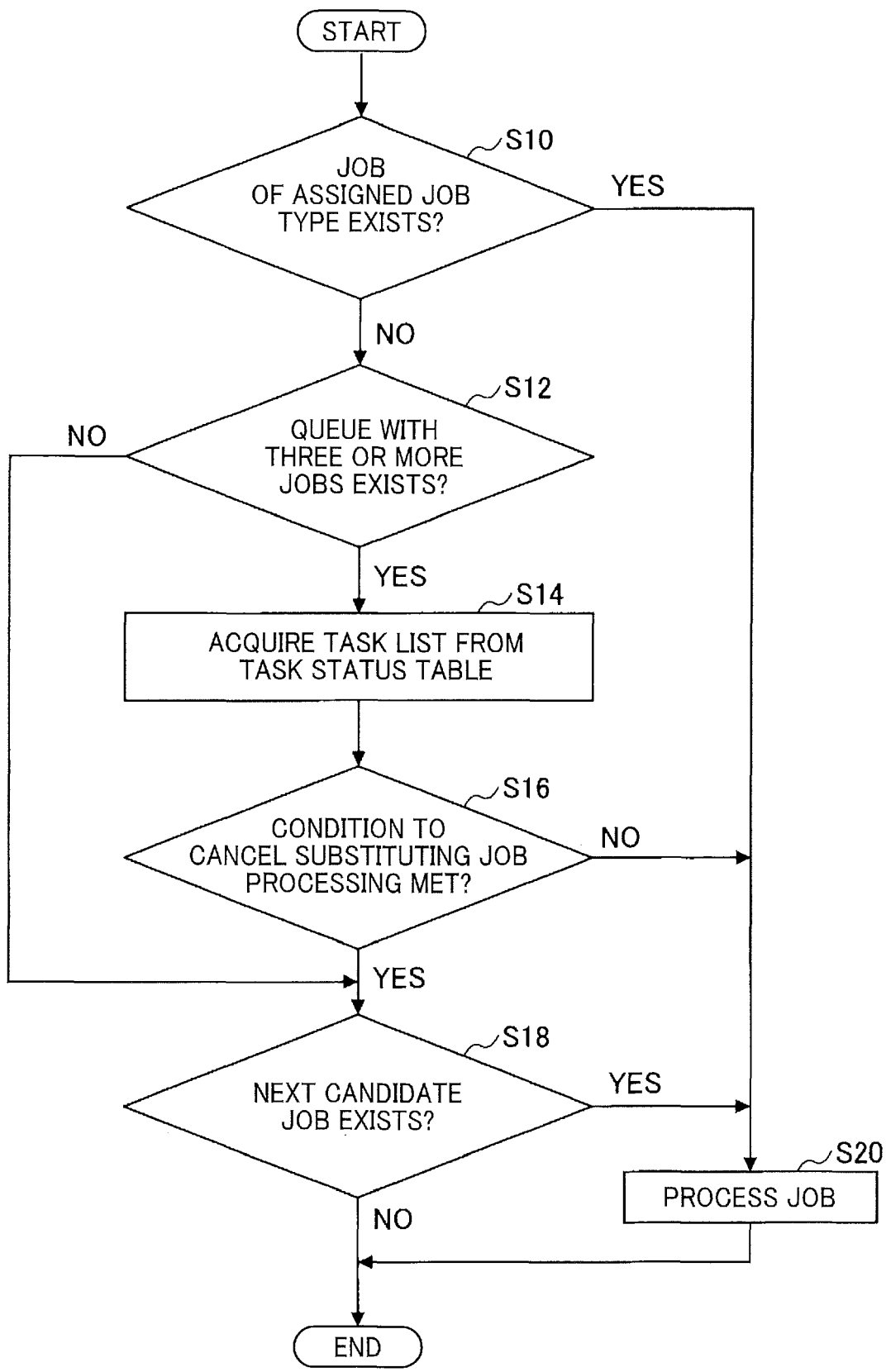
FIG. 8 is a flowchart illustrating an example of a job execution process performed by a worker.

In the service providing system 1100 according to the present embodiment, the worker 1132 performs the job execution process according to the process illustrated in the flowchart of FIG. 8, for example.

FIG. 8 is a flowchart illustrating an example of the job execution process performed by the worker.

In step S10, the worker 1132 refers to the message queue 1131 and the job information table 1203 illustrated in FIG. 9. The worker 1132 determines whether the job of the job type in which the worker 1132 is assigned to exists in the message queue 1131.

FIG. 9 is a diagram illustrating an example of the job information table.

The job information table 1203 stores information of all jobs including the job being processed, the job in an accepted status, a completed job, and the job in which an error has occurred.

The job information table 1203 includes a job identifier (ID), a user ID, a status, submitted date and time, a job type, and a parameter as data items.

The job ID is an example of job identification information.

The user ID is an example of identification information of the user who has submitted the job.

The status indicates the processing status of the job such as processing, accepted, completed, and error.

The submitted date and time indicates the date and time when the job was submitted.

The job type indicates the type of job processing.

The parameter indicates parameters required for processing the job.

If the job of the job type assigned to the worker 1132 exists in the message queue 1131 ("YES" at S10), the worker 1132 proceeds to step S20 and acquires the job of the job type assigned to the worker from the queue of the message queue 1131. The worker 1132 executes the processing of the acquired job.

On the other hand, the worker 1132 proceeds to step S12 if the job of the assigned job type does not exist in the message queue 1131 ("NO" at S10). The worker 1132 determines whether or not there is a queue in which three or more jobs of the job type assigned to the other worker 1132 exists.

The condition value (three jobs) in step S12 is an example, and any other condition value such as five jobs may be used.

If the queue in which three or more jobs of the job type assigned to the other worker 1132 exists ("YES" at S12), the worker 1132 proceeds to step S14. In step S14, the worker 1132 acquires a task list from the task status table 1204 as illustrated in FIG. 10.

FIG. 10 is a diagram illustrating an example of the task status table.

The task status table 1204 includes an assigned worker, the job ID, the job type, the status, the start date and time, and the user ID as data items.

Since the job ID, job type, status, and user ID are the same as the data items in the job information table in FIG. 9, description is omitted.

The assigned worker is an example of identification information for identifying the worker 1132.

The start date and time indicates the date and time when the processing of the job is started.

The task list read from the task status table 1204 in FIG. 10 indicates information on the job currently being executed by the worker 1132.

By using the task status table 1204 of FIG. 10, the worker 1132 can confirm the job ID, job type, status, start date and time, and user ID of the job currently being executed by the worker 1132.

In step S16, the worker 1132 refers to the task list acquired in step S14 and determines whether or not one of following conditions or a combination of the following conditions for canceling the substitution of the job processing is met.

An example of the condition for canceling the substitution of the job processing is when all of the other workers 1132 are processing the same job type as a candidate job for substitution.

Another example of the condition for canceling the substitution of the job processing is when the other worker 1132 is continuously processing the job of the job type for the substitution for a predetermined period of time (for example, 10 minutes) or more. The predetermined period of time may be determined so as to comply with the SLO even when the substitution of the job processing causes delay in processing the job of job types other than the substituted job type.

Duration of the job processing can be calculated from the difference between the current date and time and the start date and time.

Still another example of the condition for canceling the substitution of the job processing is when the user who submitted the candidate job for substitution has also submitted the job being processed by the other worker 1132.

When the following condition or the combination of conditions for canceling the substitution of the job processing are not met, the worker 1132 proceeds to step S20 and substitutes processing of the job.

The worker 1132 proceeds to step S18 if the following condition or a combination of the following conditions for canceling the substitution of the job processing is met.

In step S18, the worker 1132 refers to the message queue 1131 and the job information table 1203 again and determines whether there is a next candidate job to process.

The next candidate job is selected, for example, by a following method.

An example of the method of selecting the next candidate job is selecting the job in the queue in which three or more jobs are not stored among the jobs of the job type assigned to the other worker 1132.

For example, in the example of FIG. 7B, worker 3 selects the job "7" as the candidate job.

Another example of the method of selecting the next candidate job is referring to the job information table 1203 and selecting the job of the user who submitted the least number of jobs.

In an example of the job information table 1203 in FIG. 9, there are three jobs submitted by the user with the user ID "AAA", two jobs submitted by the user with the user ID "BBB", and one job submitted by the user with the user ID "CCC". The user who submitted the least number of jobs is the user "CCC". The worker 1132 selects the job with the job ID "8" of the user "CCC" who submitted the least number of jobs as the candidate job.

Still another example of the method of selecting the next candidate job is referring to the job information table 1203 and selecting the job having the longest elapsed time from the submitted date and time.

In the job information table 1203 in FIG. 9, the elapsed time (waiting time) from the submitted date and time can be calculated from the difference between the current date and time and the submitted date and time.

In the job information table 1203 in FIG. 9, the job with the job ID "6" having the longest elapsed time from the submitted date and time is the job type "image2pdf" determined to cancel the substitution in step S16. The worker 1132 does not select the job with the job ID "6" having the longest elapsed time from the submitted date and time as the candidate job.

The worker 1132 selects the job with the job ID "7" having the second longest elapsed time from the submitted date and time as the candidate job.

Still another example of the method of selecting the next candidate job is referring to the task status table 1204 and the processing load table 1205 illustrated in FIG. 11, selecting a light load job as the candidate job when a heavy load job is being executed, and selecting a heavy load job as a candidate job when a light load job is being executed.

FIG. 11 is a diagram illustrating an example of the processing load table.

The processing load table 1205 has the job type and resource consumption as data items.

The processing load table 1205 indicates a resource consumption amount obtained by quantifying a resource load when executing the job of each job type.

The larger the numerical value of the resource consumption, the heavier the resource load.

For example, the resource consumption is an index value calculated based on a number of CPU cores, an amount of memory, and HDD capacity used in the processing among the resources of a server instance that executes the processing of the job, and the processing time.

In the example of processing load table 1205 in FIG. 11, for example, if the job of the job type "ocr" is being executed, the worker 1132 selects the job of the job type "send_mail" as the candidate job.

For example, if the job of the job type "image2pdf" is being executed, the worker 1132 selects the job of the job type "barcodeRecognition" as the candidate job.

For example, in the processing load table 1205 in FIG. 11, the worker 1132 selects the candidate job so that the total value of the resource consumption does not become larger than "110".

In step S18, when there is the next candidate job ("YES" at S18), the worker 1132 proceeds to step S20 and substitutes the processing for the next candidate job.

When there is no next candidate job ("NO" at S18), the worker 1132 waits until the next polling without executing the job.

In step S12, the worker 1132 skips to step S18 when there is no queue in which three or more jobs of the job type assigned to the other worker 1132 are stored.

The job execution process illustrated in the flowchart of FIG. 8 is described using worker 3 of FIG. 7B as an example.

In step S10, the worker 3 determines that the job of the assigned job type "barcodeRecognition" does not exist in the message queue 1131.

In step S12, the worker 3 determines that three or more jobs of the job type "image2pdf" assigned to the worker 1 are stored in the queue.

In step S14, the worker 3 acquires the task list from the task status table 1204.

Note that the worker 1132 writes the task list in the task status table 1204 when executing the job processing in step S20.

In step S16, the worker 3 determines that the example of the condition for canceling the substitution of the job processing "all of the other workers 1132 are processing the same job type as the candidate job for substitution" is met. The worker 3 cancels substituting the processing the job "6" in FIG. 7B.

In step S18, the worker 3 selects the job "7" in the queue in which three or more jobs are not stored as a candidate job and performs processing.

According to the present embodiment, the service providing system 1100 is capable of reducing inefficiency in the substitution of the job processing.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above.

Each of the functions of the described embodiments may be implemented by one or more processing circuits or circuitry.

Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The worker 1132 is an example of a processor, which includes circuitry as described above.

The queue of the message queue 1131 is an example of one or more memories.

The system 1000 and the service providing system 1100 are examples of an information processing system.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above.

What is claimed is:

1. An information processing system including at least one information processing apparatus, the information processing system comprising:
    at least one memory configured to store a plurality of jobs in order, each job of the plurality of jobs has a type of processing to be executed; and
    a plurality of processors each processor being assigned to a specific type of processing to be executed, each processor being configured to
        process a job has a first type of processing being assigned to another processor stored in the memory in substitution for the another processor based on a determination that the plurality of jobs stored in the memory does not include a job has a corresponding type of processing being assigned to the each processor, and
        cancel substituting of the processing of the job assigned to the another processor according to a processing status of at least one of the plurality of processors, wherein the processing status of the at least one of the plurality of processors including: all other processors of the plurality of processors are executing jobs have the first type of processing, at least one of the all other processors of the plurality of processors is continuing to process one or more jobs have the first type of processing for a predetermined period of time or longer, or at least one of the all other processors of the plurality of processors is processing one or more jobs requested by the same who has requested the job has the first type of processing to be executed in substitution.

2. The information processing system of claim 1, wherein the each processor is configured to select the job requested from a user who has the least number of jobs stored in the memory as a candidate job to substitute processing.

3. The information processing system of claim 1, wherein the each processor is configured to select the job having the longest elapsed time since the job has been stored in the memory as a candidate job to substitute processing.

4. The information processing system of claim 1, wherein the each processor is configured to select a candidate job to substitute the processing based on a processing load of the candidate job according to the first type of the processing, to prevent a resource consumption amount consumed by the information processing system from exceeding a preset value.

5. An information processing method comprising:
    storing in at least one memory a plurality of jobs in order, each job of the plurality of jobs has a type of processing to be executed;
    with each processor of a plurality of processors, each processor being assigned to a specific type of processing to be executed,
    processing a job has a first type of processing being assigned to another processor stored in the memory in substitution for the another processor based on a determination that the plurality of jobs stored in the memory does not include a job has a corresponding type of processing being assigned to a corresponding processor; and
    canceling substituting of the processing of the job assigned to the another processor according to a processing status of the at least one of the plurality of processors, wherein the processing status of the at least one of the plurality of processors including: all other processors of the plurality of processors are executing jobs have the first type of processing, at least one of the all other processors of the plurality of processors is continuing to process one or more jobs have the first type of processing for a predetermined period of time or longer, or at least one of the all other processors of the plurality of processors is processing one or more jobs requested by the same who has requested the job has the first type of processing to be executed in substitution.

6. An information processing apparatus comprising:

at least one memory configured to store a plurality of jobs in order, each job of the plurality of jobs has a type of processing to be executed by at least one of a plurality of processors; and a processor, being one of the plurality of processors, configured to process a job has a first type of processing being assigned to another processor stored in the memory in substitution for the another processor based on a determination that the plurality of jobs stored in the memory does not include a job has a corresponding type of processing being assigned to the processor, and cancel substituting of the processing of the job assigned to the another processor according to a processing status of at least one of the plurality of processors, wherein the processing status of the at least one of the plurality of processors including: all other processors of the plurality of processors are executing jobs have the first type of processing, at least one of the all other processors of the plurality of processors is continuing to process one or more jobs have the first type of processing for a predetermined period of time or longer, or at least one of the all other processors of the plurality of processors is processing one or more jobs requested by the same who has requested the job has the first type of processing to be executed in substitution.

\* \* \* \* \*